United States Patent [19]
Yoshimura et al.

[11] Patent Number: 5,180,892
[45] Date of Patent: Jan. 19, 1993

[54] ACCELERATION SENSOR WITH MAGNETICALLY INFLUENCED ROTARY MEMBER

[75] Inventors: Kazuo Yoshimura; Satoh Ryo, both of Kanagawa, Japan

[73] Assignee: Takata Corporation, Tokyo, Japan

[21] Appl. No.: 801,870

[22] Filed: Dec. 3, 1991

[30] Foreign Application Priority Data

Dec. 25, 1990 [JP] Japan .................. 2-405801

[51] Int. Cl.$^5$ ............................................. H01H 35/14
[52] U.S. Cl. ........................... 200/61.45 M; 200/61.51
[58] Field of Search ............... 200/61.45 R, 61.45 M, 200/61.46, 61.48, 61.51, 61.83

[56] References Cited

U.S. PATENT DOCUMENTS

| | | | |
|---|---|---|---|
| 2,263,230 | 11/1941 | Young | 200/61.51 |
| 2,307,718 | 1/1943 | Barnet | 200/61.51 |
| 2,721,238 | 10/1955 | Ferris | 200/61.51 |
| 3,240,891 | 3/1966 | Bergey | 200/61.46 |
| 3,911,237 | 10/1975 | Naito et al. | 200/61.46 |
| 4,827,091 | 5/1989 | Behr | 200/61.45 M |

Primary Examiner—J. R. Scott
Attorney, Agent, or Firm—Kanesaka and Takeuchi

[57] ABSTRACT

Disclosed is an acceleration sensor comprising: a rotary member rotatable about a rotary shaft having its gravity center positioned outwardly of the rotary shaft and a conductive member constituting at least a part of the portion other than the rotary shaft; a magnet provided opposite to the conductive member during a rotation of the rotary member; and a rotation detecting device for detecting a predetermined rotational angle of the rotary member. The locations of the magnet and the conductive member may be reversed.

14 Claims, 2 Drawing Sheets

ACCELERATION SENSOR WITH MAGNETICALLY INFLUENCED ROTARY MEMBER

BACKGROUND OF THE INVENTION

1. Field of the Invention

The present invention relates to an acceleration sensor and, more particularly, to an acceleration sensor suited to detect a large change in velocity which is caused by a collision of a vehicle.

2. Description of the Prior Arts

This type of acceleration sensor disclosed in U.S. Pat. No. 4,827,091 comprises: a cylinder composed of a conductive material; a magnetized inertial member so mounted in the interior of the cylinder as to be movable in the longitudinal direction of the cylinder; a conductive member mounted on at least one end surface of the magnetized inertial member and disposed, in the longitudinal direction of the cylinder; a pair of electrodes disposed at one end of the cylinder in the longitudinal direction and made conductive through the conductive member upon contact with the conductive member of the magnetized inertial member; and an attracting member disposed at the other end of the cylinder in the longitudinal direction and composed of a magnetic material which magnetically attracts the magnetized inertial member.

In this acceleration sensor, the magnetized inertial member and the attracting member attract each other. When no or almost no acceleration is applied to the acceleration sensor, the magnetized inertial member is stationary at the other end within the cylinder.

If a relatively large acceleration acts on this acceleration sensor, the magnetized inertial member moves while resisting the attracting force of the attracting member. When the magnetized inertial member is moving, an induced current flows in this cylinder. A magnetic force is given to the magnetized inertial member, thereby biasing this member in a direction opposite to the moving direction to provide a state where the magnetized inertial member is braked. Its moving velocity is thereby reduced.

If the acceleration is smaller than a predetermined value, i.e., threshold value, the magnetized inertial member does not reach the top end of the cylinder. The magnetized inertial member moves and then stops midways. Subsequently, the magnetized inertial member is pulled back to the other end by the attracting force of the attracting member.

Whereas if the acceleration is greater than the predetermined value i.e., threshold value, in other words, if the vehicle mounted with this acceleration sensor is, for instance, collided, the magnetized inertial member reaches one end of the cylinder. A conductive layer on the top end surface of the magnetized inertial member contacts both of the pair of electrodes, thus making the electrodes conductive to each other. If a voltage is applied beforehand between the electrodes, the current flows in between the electrodes when the electrodes are short-circuited. The collision of the vehicle is detected from this current.

In the conventional acceleration sensor, the magnetized inertial member moves in the interior of the cylinder. Hence, the cylinder considerably increases in size in the longitudinal direction, and correspondingly the acceleration sensor as a whole assumes a large and long cylindrical shape. For this reason, an intra-vehicle space for incorporating the acceleration sensor becomes relatively large.

SUMMARY OF THE INVENTION

It is a primary object of the present invention to provide an acceleration sensor which is compact both in configuration and in size, this sensor being capable of detecting that an acceleration having a predetermined or greater magnitude has been applied owing to a combination of a bar-like or disk-like rotary member, a conductive material and a magnet, and also requiring a small space enough to incorporate itself into a vehicle or the like.

It is another object of the present invention to provide an acceleration sensor capable of accurately analyzing the acceleration by extremely reducing a frictional force of bearings for supporting the rotary members and being manufactured at a less cost.

To accomplish these objects, according to one aspect of the present invention, there is provided an acceleration sensor comprising: a rotary member rotatable about a rotary shaft and having its gravity center positioned outwardly of the rotary shaft and a conductive member constituting at least a portion other than the rotary shaft; a magnet provided opposite to a moving region of the conductive member during rotation of the rotary member; and rotation detecting means for detecting a predetermined rotational angle of the rotary member.

According to another aspect of the present invention, there is provided an acceleration sensor comprising: a rotary member rotatable about a rotary shaft having its gravity center positioned outwardly of the rotary shaft and a magnet constituting at least a portion other than the rotary shaft; a conductive member provided opposite to a moving region of the magnet during rotation of the rotary member; and a rotation detecting member for detecting a predetermined rotation at angle of the rotary member.

The acceleration sensor according to the present invention includes the rotary member having its rotary shaft which does not coincide with the gravity center. When no or almost no acceleration is applied to the acceleration sensor, the rotary member rotation remains stationary in such a position so that the gravity center is positioned perpendicularly downwardly of the rotary shaft.

When a relatively large acceleration is applied to this acceleration sensor, the rotary member rotates while resisting the gravity. When the rotary member is rotating, an induced current flows in the conductive member. A magnetic force is given to the rotary member, thereby biasing the rotary member in a direction opposite to the rotary direction to form a state where the rotary member is braked, and a moving velocity thereof is reduced.

If the acceleration is greater than a predetermined value i.e., threshold value namely, the rotary member rotates more than the predetermined angle, the rotational angle larger than the predetermined angle is detected by the detecting means, thus detecting a collision of the vehicle.

Whereas if an acceleration is smaller than the predetermined value i.e., threshold value, the rotary member rotates slightly through a very small angle and stops prior to reaching the end of the predetermined angle of rotation. Subsequently, the rotary member is pulled back to the original position by the gravity.

BRIEF DESCRIPTION OF THE DRAWINGS

Other objects and advantages of the present invention will become apparent through the following discussion taken in conjunction with the accompanying drawings, in which.

DESCRIPTION OF THE PREFERRED EMBODIMENTS

Embodiments will hereinafter be described with reference to the accompanying drawings.

Figure 1:
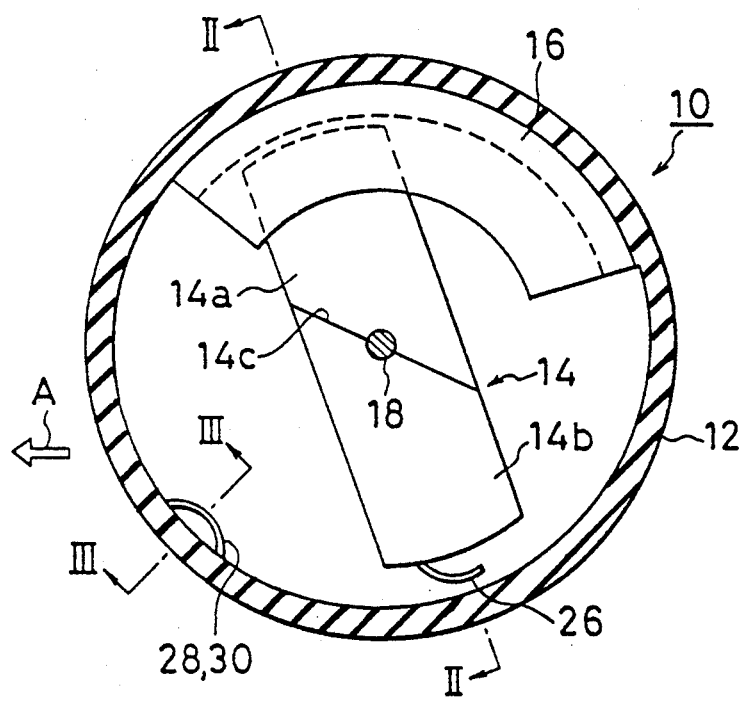
FIG. 1 is a front elevation in section taken along the line I—I of FIG. 2, illustrating an acceleration sensor in an embodiment of the present invention.
Figure 2:
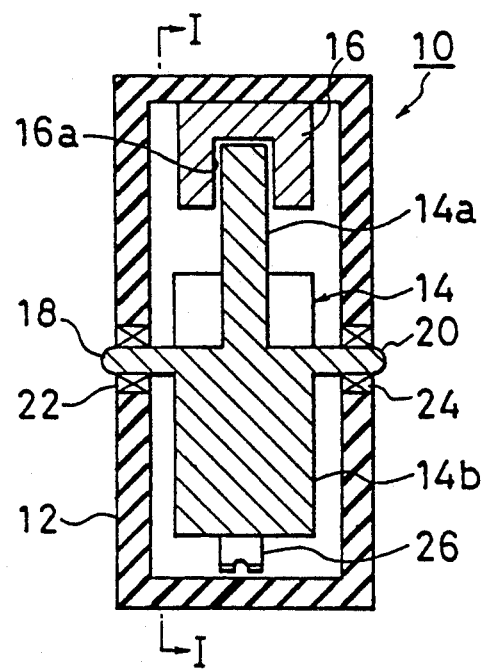
FIG. 2 is a sectional view taken substantially along the line II—II of FIG. 1.
Figure 3:
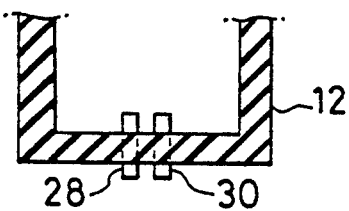
FIG. 3 is a sectional view taken substantially along the line III—III of FIG. 1.

FIG. 1 is a front sectional view taken substantially along the line I—I of FIG. 2, illustrating an acceleration sensor in an embodiment of the present invention. FIG. 2 is a sectional view taken substantially along the line II—II of FIG. 1. FIG. 3 is a sectional view taken substantially along the line III—III of FIG. 1.

An acceleration sensor 10 in this embodiment is constructed mainly of a ring-like casing 12, a rotary member 14 encased in the casing 12 and a magnet 16. This rotary member 14 is a bar-like member extending in radial directions of the casing 12 and includes a pair of rotary shafts 18, 20 in the intermediate portion in the longitudinal direction. The rotary shafts 18, 20 are pivotally supported on bearings 22, 24. A one half portion of this rotary member 14 in the longitudinal direction serves as a thin portion 14a. The other half portion thereof serves as a thick portion 14b. The reference symbol 14c in FIG. 1 indicates a stepped portion of a boundary between the thin portion 14a and the thick portion 14b.

Note that this rotary member 14 is composed of a conductive metal material such as aluminum, stainless steel and copper as a whole.

The magnet 16 described above assumes such a configuration as to extend in a circular arc along the inner peripheral surface of the casing 12. The magnet 16 also assumes, as illustrated in FIG. 2, a substantially U-shape in section taken in the radial direction of the casing 12. The thin portion 14a of the rotary member 14 is fitted in a central recess 16a. Note that a very small gap is formed between the outer surface of the thin portion 14a and the surface of the recess 16a.

A contact electrode 26 composed of a flexible metal piece is mounted on the outer peripheral surface of the thick portion 14b of the rotary member 14. The inner peripheral surface of the casing 12 is provided with a pair of terminal electrodes 28, 30 which can contact with the contact electrode 26.

Note that the stepped portion 14c extends obliquely to the longitudinal direction of the rotary member 14. Hence, where the acceleration sensor 10 is installed so that the up and down directions of FIG. 1 are set vertically as illustrated in FIG. 1, the thick portion 14b is positioned under the thin portion 14a, while the rotary member 14 stops in such a position so that the longitudinal direction of the rotary member 14 slightly intersects the vertical line.

In the thus constructed acceleration sensor 10, when an acceleration is applied to the acceleration sensor 10 in an arrowed direction A, the thick portion 14b of the rotary member 14 rotates clockwise toward the arrowed direction A. With a rotation of this rotary member 14 made of a conductive material, a magnetic field of the magnet 16 provided on an inner periphery of the casing 12 and outside the rotary member 14 is cut off. Therefore, an induced current flows in the conductive material rotary member 14. This action, i.e., current flowing through the rotary member 14 due to cutting off the magnetic field, impedes movement of the rotary member 14.

If this acceleration is larger than a predetermined acceleration, the rotary member 14 rotates largely, and the contact electrode 26 contacts the terminal electrodes 28, 30. For this reason, if a voltage is previously impressed between the terminal electrodes 28, 30, the current runs in between the terminal electrodes 28, 30. Detected is the fact that the acceleration larger than the predetermined acceleration has been applied to the acceleration sensor 10. A collision of the vehicle is thereby detectable.

Whereas if the acceleration applied to the acceleration sensor 10 in the arrowed direction A is smaller than the predetermined acceleration, the thick portion 14b of the rotary member 14 rotates slightly in the clockwise direction of FIG. 1. The contact electrode 26 does not contact the terminal electrodes 28, 30. Before the contact electrode 26 reaches the terminal electrodes 28, 30, the rotary member 14 stops and eventually reverts to the position shown in FIG. 1 by gravity.

Incidentally, as obvious from the description given above, in accordance with this embodiment, the rotation detecting means for detecting a rotation at angle of the rotary member 14 consists of the contact electrode 26 and the terminal electrodes 28, 30. According to the present invention, however, rotation detecting means other than the rotation detecting means constructed of these electrodes 26, 28, 30 can be adopted. For instance, a limit switch and a reed switch are usable as such rotation detecting means.

In the embodiment discussed above, the rotary member 14 is provided with the contact electrode 26, while the casing 12 is provided with terminal electrodes 28, 30. However, one electrode may be attached to the casing 12, and a lead wire may be also connected to the rotary shaft 18 or 20.

Figure 4:
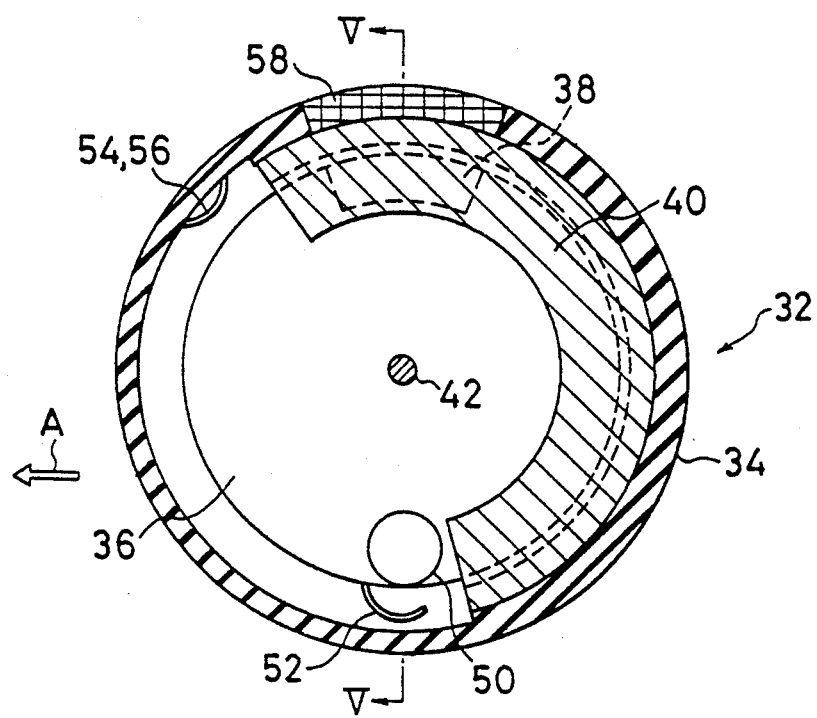
FIG. 4 is a plan sectional view taken along the line IV—IV of FIG. 5, depicting an acceleration sensor in a different embodiment of the present invention.
Figure 5:
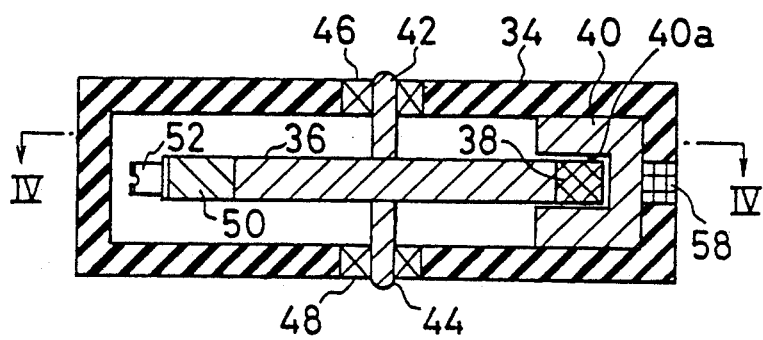
FIG. 5 is a sectional view taken substantially along the line V—V of FIG. 4.

FIG. 4 is a plan sectional view taken substantially along the line IV—IV of FIG. 5, illustrating an acceleration sensor in another embodiment of the present invention. FIG. 5 is a sectional view taken substantially along the line V—V of FIG. 4. This acceleration sensor 32 consists chiefly of: a ring-like casing 34; a rotary member 36 encased in the casing 34; a magnet 38 provided on the peripheral portion of the rotary member 36; and a conductive member 40 so provided along the inner peripheral surface of the casing 34 as to confront the rotational region of the magnet 38.

The rotary member 36 is a disk-like member composed of a non-magnetic material such as a synthetic resin and aluminum. A pair of rotary shafts 42, 44 is erectly provided at the central part thereof. The rotary shafts 42, 44 are pivotally supported on bearings 46, 48 secured to the casing 34. The magnet 38 and a weight 50 are provided in positions facing to each other with the rotary shafts 42, 44 being interposed therebetween. This weight 50 is considerably heavier than the magnet 38, and hence the center of gravity of the rotary member 36 is middled on a radial line connecting the center of the weight 50 to the rotary shafts 42, 44.

The conductive member 40 assumes a circular arc to extend along the inner peripheral surface of the casing 34. The conductive member 40 also assumes a substantially U-shape in section taken in the diametral direction of the rotary member 36. The magnet 38 is fitted in a central recess 40a of the conductive member 40. Note that a small gap is formed between the outer surface of the magnet 38 and the surface of the recess 40a.

A contact electrode 52 is provided on the outer peripheral surface of the rotary member 36. Terminal electrodes 54, 56 are provided on the inner peripheral surface of the casing 34. These contact electrodes 52 and the terminal electrodes 54, 56 are constructed in the same way with the contact electrode 26 and the terminal electrodes 28, 30. The numeral 58 designates an iron piece.

In the thus constructed acceleration sensor 32, when the acceleration is applied in the arrowed direction A, the rotary member 36 rotates clockwise in FIG. 4. With a rotation of the rotary member 36, a magnetic field of the magnet 38 positioned on a peripheral portion of the rotary member 36 and inside the recess 40a of the conductive member 40, is cut off. Therefore, the induced current flows in the conductive member 40. This action, i.e., current flowing through the rotary member 36 due to cutting off the magnetic field, actuates to stop movement of the rotary member 36. If this acceleration is greater than a predetermined acceleration, the rotary member 36 rotates largely till the contact electrode 52 contacts the terminal electrodes 54, 56. The electrodes 52, 54, 56 are made conductive, thereby detecting that the acceleration larger than the predetermined acceleration has been applied.

Whereas if the acceleration applied in the arrowed direction A is smaller than the predetermined acceleration, the rotary member stops before the contact electrode 52 contacts the terminal electrodes 54, 56. The rotary member reverts to the original posture shown in FIG. 4 by gravity and the attracting force between the iron piece 58 and the magnet 38.

In this embodiment also, the rotation detecting means for detecting rotational angle of the rotary member is based on the electrodes 52, 54, 56. As explained before, however, a variety of rotation detecting means other than the illustrated means are usable.

As discussed above, the acceleration sensor of the present invention is capable of detecting that the acceleration greater than a predetermined acceleration has been applied owing to the combination of the bar-like or disk-like rotary member, the conductive material and the magnet. This acceleration sensor, which is compact both in configuration and in size, requires a small space enough to incorporate itself into a vehicle or the like. The frictional force of the bearings for supporting the rotary member is extremely small, and hence the acceleration can be analyzed with high accuracy. Besides, it is possible to reduce the costs for manufacturing the acceleration sensor.

Although the illustrative embodiments have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. An acceleration sensor comprising:
   a rotary member including a rotary shaft, said rotary member being rotatable about the rotary shaft and having a gravity center positioned outwardly of said rotary shaft and a conductive member constituting at least a part of the rotary member other than said rotary shaft;
   a magnet situated at a side opposite to said conductive member so that when the rotary member rotates upon detection of an acceleration, current is induced in the conductive member by means of the magnet, which impedes the rotation of said rotary member; and
   rotation detecting means for detecting a predetermined rotational angle of said rotary member so that when an acceleration larger than a predetermined value is applied to the acceleration sensor, the detecting means operates.

2. The sensor as set forth in claim 1, further comprising a casing for receiving the rotary member therein.

3. The sensor as set forth in claim 2, wherein said rotary member has a configuration of a bar, and said rotary shaft is positioned in a mid-portion of said bar in the longitudinal direction.

4. The sensor as set forth in claim 3, wherein a one half portion of said bar in the longitudinal direction is formed of a thin portion, while the other half portion thereof is formed of a thick portion so that a gravity center of said bar is positioned in the other half portion.

5. The sensor as set forth in claim 3, wherein said rotary member is constructed of a conductive material.

6. The sensor as set forth in claim 3, wherein said magnet has a circular arc shape and extends along an inner peripheral surface of said casing, said magnet having a substantially U-shape in section in a radial direction of said casing so that one end of said rotary member is situated in an interior of said U-shaped portion to induce current in said rotary member when said rotary member rotates.

7. The sensor as set forth in claim 2, wherein said rotation detecting means includes electrodes provided in said casing and an electrode provided on said rotary member, said electrodes contacting each other to become conductive electrically when said rotary member has surpassed the predetermined rotational angle.

8. An acceleration sensor comprising:
   a rotary member including a rotary shaft, said rotary member being rotatable about the rotary shaft and having a gravity center positioned outwardly of said rotary shaft and a magnet constituting at least a part of the rotary member rotating about said rotary shaft;
   a conductive member situated at a side opposite to said magnet so that when the rotary member rotates upon detection of an acceleration, current is induced in the conductive member by means of the magnet, which impedes the rotation of said rotary member; and
   rotation detecting means for detecting a predetermined rotational angle of said rotary member so that when an acceleration larger than a predetermined value is applied to the acceleration sensor, the detecting means operates.

9. The sensor as set forth in claim 8, further comprising a casing for receiving the rotary member therein.

10. The sensor as set forth in claim 9, wherein said rotary member has a configuration of a disc, and said rotary shaft is positioned in a center thereof.

11. The sensor as set forth in claim 10, wherein said rotary member further includes a weight so that said magnet and the weight are disposed symmetrical to said rotary shaft.

12. The sensor as set forth in claim 11, wherein said conductive member has a circular arc shape and extends along an inner peripheral surface of said casing, said conductive member having a substantially U-shape a radial direction of said casing so that the magnet disposed at a peripheral edge of said rotary member is situated in an interior of said U-shaped portion.

13. The sensor as set forth in claim 9, wherein said rotation detecting means includes a plurality of electrodes provided in said casing and an electrode provided on said rotary member, said electrodes contacting each other to becomes conductive electrically when said rotary member has surpassed the predetermined rotational angle.

14. The sensor as set forth in claim 9, wherein said casing includes an iron piece so that said rotary member is retained in a predetermined position by an attracting force between said iron piece and the magnet when no acceleration is applied.

* * * * *

UNITED STATES PATENT AND TRADEMARK OFFICE
CERTIFICATE OF CORRECTION

PATENT NO. : 5,180,892

DATED : January 19, 1993

INVENTOR(S) : Kazuo Yoshimura et al

It is certified that error appears in the above-identified patent and that said Letters Patent is hereby corrected as shown below:

On title page, item [75] change,

"Satoh Ryo" to -- Ryo Satoh--.

Signed and Sealed this

Twenty-sixth Day of October, 1993

Attest:

BRUCE LEHMAN

Attesting Officer     Commissioner of Patents and Trademarks